No. 704,321. Patented July 8, 1902.
G. W. GREENWOOD.
KNEE JOINT OR HINGE CONNECTION.
(Application filed Mar. 31, 1902.)
(No Model.)
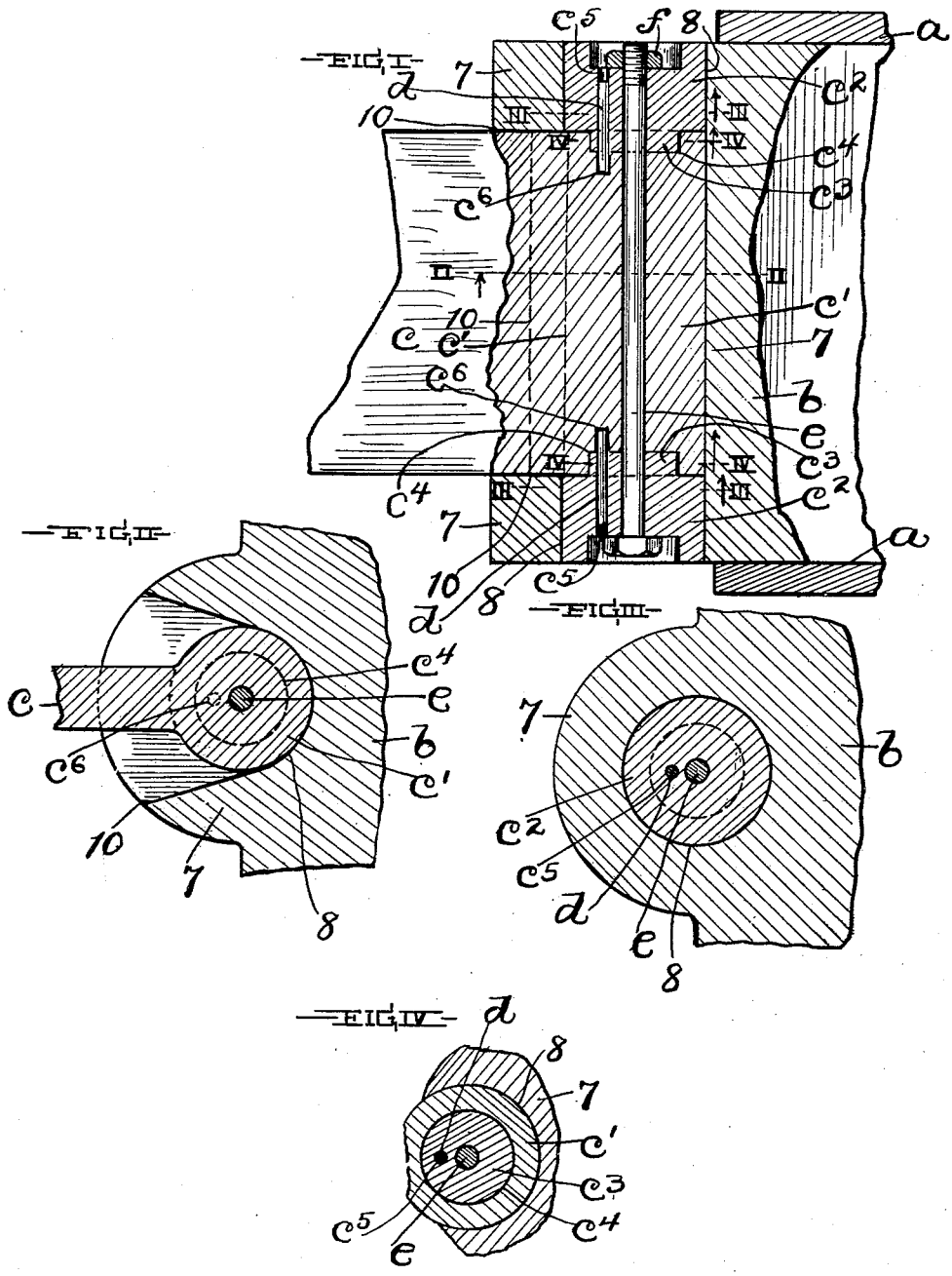
WITNESSES:
Daniel E. Daly
G. M. Hayes
INVENTOR
George W. Greenwood
BY
his ATTORNEYS

UNITED STATES PATENT OFFICE.

GEORGE W. GREENWOOD, OF CLEVELAND, OHIO.

KNEE-JOINT OR HINGE CONNECTION.

SPECIFICATION forming part of Letters Patent No. 704,321, dated July 8, 1902.

Application filed March 31, 1902. Serial No. 100,843. (No model.)

*To all whom it may concern:*

Be it known that I, GEORGE W. GREENWOOD, a citizen of the United States of America, residing at Cleveland, in the county of Cuyahoga and State of Ohio, have invented certain new and useful Improvements in Knee-Joints or Hinge Connections; and I hereby declare the following to be a full, clear, and exact description of the invention, such as will enable others skilled in the art to which it pertains to make and use the same.

This invention relates to improvements in knee-joints or hinge connections between two parts or members of a machine.

The primary object of this invention is to provide an improved construction of knee-joint or hinge connection between the said two parts or members of the machine, to render the assemblage of the said parts convenient, to render the joint strong, durable, and inexpensive, and to provide the joint with large wearing surfaces.

With this object in view the invention consists in certain peculiarities of construction and combinations of parts hereinafter described, and pointed out in the claims.

In the accompanying drawings, Figure I is a side elevation, largely in section, of the aforesaid improved joint or hinge connection. Fig. II is a section on line II II, Fig. I, looking in the direction indicated by the arrow. Fig. III is a section on lines III III, Fig. I, looking in the direction indicated by the arrow. Fig. IV is a section on the lines IV IV, Fig. I, looking in the direction indicated by the arrow.

Referring to the drawings, $a$ designates guideways for a slide $b$, adapted to reciprocate or operate endwise of the said guideways, and $c$ represents a pitman, rod, or link employed in the transmission of power from or to the aforesaid reciprocating member $b$. The members $b$ and $c$ are therefore joined together by a knee-joint or hinge connection capable of permitting the part $c$ to move into or assume different angular positions relative to the part $b$, and the improved construction of knee-joint or hinge connection between the parts $b$ and $c$ or between two parts of any machine constitutes the subject-matter of this application.

The part $c$ terminates at its end which is connected to the part $b$ in a journal or bearing which is contained within a corresponding box 7, formed upon the adjacent end of the part $b$. The central section or portion $c'$ of the said journal is integral with the part $c$; but two cylindrical sections $c^2$ and $c^2$ form opposite end portions, respectively, of the said journal and are arranged in line endwise with the said central section, and the said sections $c'$ and $c^2$ are assembled and fixed together, as will hereinafter appear. The box 7 has therefore a cylindrical chamber 8, engaged by the aforesaid journal. The chamber 8 extends from end to end of the box and is open at both ends.

The surrounding wall of the chamber 8 affords bearing for the aforesaid journal and is slotted laterally, as at 10, centrally between the ends of the box 7 to accommodate the location and operation of the part $c$. The said journal extends beyond the remaining or contiguous portion of the part $c$ longitudinally of the box 7, and the surrounding wall of the chamber 8 completely surrounds and forms the largest possible bearing for the journal at the ends of the chamber.

As already indicated, the aforesaid journal is composed in the main of three sections— a central section $c'$ and two end sections $c^2$ and $c^2$, arranged at and abutting against opposite ends, respectively, of the central section $c'$. The central section $c'$ of the journal extends from end to end of the slot 10, and the said slot is wide enough to accommodate the introduction of the said section $c'$ into the box 7 through the said slot. The end sections $c^2$ and $c^2$ are placed in position during the assemblage of the parts by inserting them into opposite ends, respectively, of the chamber 8 of the box 7 against opposite ends, respectively, of the central section $c'$.

A bolt $e$ and a nut $f$ coöperate in holding the sections $c'$ and $c^2$ together. The bolt $e$ extends centrally and longitudinally of and through the said journal-sections and is arranged with its head bearing against the outer end of one of the end sections $c^2$, and the nut $f$ is mounted upon the correspondingly-screw-threaded shank of the bolt at and abuts against the outer end of the other end section $c^2$, and obviously the journal-sections $c'$ and $c^2$ have registering bolt-receiving holes to accommodate the application of the said bolt.

To prevent strain upon the bolt during the operation of the parts $b$ and $c$, each end section $c^2$ is provided at its inner end with an inwardly-projecting annular flange $c^3$, which surrounds the bolt $e$ and engages a corresponding recess $c^4$, formed in the adjacent end of the central section $c'$ of the journal. Each end section $c^2$ is provided also at one side of its bolt-hole with a hole $c^5$, which extends, preferably, longitudinally through the said section $c^2$ and registers with a corresponding hole $c^6$, formed in the adjacent end of the central section $c'$, and the said holes $c^5$ and $c^6$ are engaged by a dowel-pin $d$, which is forced into the said hole $c^6$ through the said hole $c^5$ and prevents circumferential displacement of the said end section $c^2$ relative to the central section $c'$, so that the said sections $c'$ and $c^2$ when they have been nicely fitted together will not wear upon each other circumferentially of the aforesaid bolt.

By the construction hereinbefore described it will be observed that the end portions of the box 7 completely surround and afford the largest possible bearing for the end sections $c^2$ of the journal, that the joint or hinge connection possesses great strength and durability, and that the component parts of the journal are conveniently assembled or separated and maintained in proper condition.

What I claim is—

1. A knee-joint or hinge connection between two parts or members of a machine, comprising an open-ended box formed on one part and having a lateral slot 10 extending along its central portion between and a suitable distance from each end of the box, and a journal formed on the other part and having bearing in the aforesaid box, which journal comprises a central section adapted to be passed into or out of the box through the aforesaid slot, and two cylindrical end sections having bearing within opposite end portions, respectively, of the box beyond opposite ends, respectively, of the aforesaid slot and arranged, at opposite ends, respectively of and in line with the central journal-section, and means holding the said journal-sections together, substantially as and for the purpose set forth.

2. A knee-joint or hinge connection between two parts or members of a machine, comprising an open-ended box formed on one part and having a lateral slot 10 extending along its central portion between and a suitable distance from each end of the box, and a journal formed on the other part and having bearing in the aforesaid box, which journal comprises a central section adapted to be passed into and out of the box through the aforesaid slot and two cylindrical end sections having bearing within opposite end portions, respectively, of the box beyond opposite ends, respectively, of the aforesaid slot and arranged at opposite ends, respectively, of and in line with the central journal-section and projecting, at their inner ends, into the said central journal-section, and means holding the said journal-sections together, substantially as and for the purpose set forth.

3. A knee-joint or hinge connection between two parts or members of a machine, comprising an open-ended box formed on one part and having a lateral slot 10 extending along its central portion between and a suitable distance from each end of the box, and a journal formed on the other part and having bearing in the aforesaid box, which journal comprises a central section adapted to be passed into or out of the box through the aforesaid slot and two cylindrical end sections having bearing within opposite end portions, respectively, of the box beyond opposite ends, respectively of the aforesaid slot and arranged, at opposite ends, respectively, of and in line with the central journal-section and projecting, at their inner ends, into the said central journal-section; pins extending from within the end journal-sections into the central journal-section, and means holding the said journal-sections in their assembled position, substantially as and for the purpose set forth.

4. A knee-joint or hinge connection between two parts or members of a machine, comprising an open-ended box formed on one part and having a lateral slot 10 extending along its central portion between and a suitable distance from each end of the box, and a journal formed on the other part and having bearing in the aforesaid box, which journal comprises a central section adapted to be passed into or out of the box through the aforesaid slot and two cylindrical end sections having bearing within opposite end portions, respectively, of the box beyond opposite ends, respectively, of the central journal-section and projecting, at their inner ends, into the said central section, and a bolt and a nut applied as required to hold the journal-sections in their assembled position, substantially as and for the purpose set forth.

5. A knee-joint or hinge connection between two parts or members of a machine, comprising an open-ended box formed on one part and having a lateral slot 10 extending along its central portion between and a suitable distance from each end of the box, and a journal formed on the other part and having bearing in the aforesaid box, which journal comprises a central section adapted to be passed into or out of the box through the aforesaid slot and two cylindrical end sections having bearing within opposite end portions, respectively, of the box beyond opposite ends, respectively, of the aforesaid slot and arranged, at opposite ends, respectively, of the central journal-section and projecting, at their inner ends, into the said central section; a bolt extending centrally and longitudinally of and through the said journal-sections and arranged with its head bearing against the outer end of one of the aforesaid end sections, and a nut mounted upon the shank of the bolt at and arranged to bear against the outer end of the other end section of the journal, substantially as and for the purpose set forth.

In testimony whereof I sign the foregoing specification, in the presence of two witnesses, this 22d day of March, 1902, at Cleveland, Ohio.

GEORGE W. GREENWOOD.

Witnesses:
C. H. DORER,
VELSA SCHWARTZ.